July 30, 1935. A. C. CLAYTON 2,009,477
CHANGE SPEED GEAR
Filed Jan. 23, 1935 5 Sheets-Sheet 3
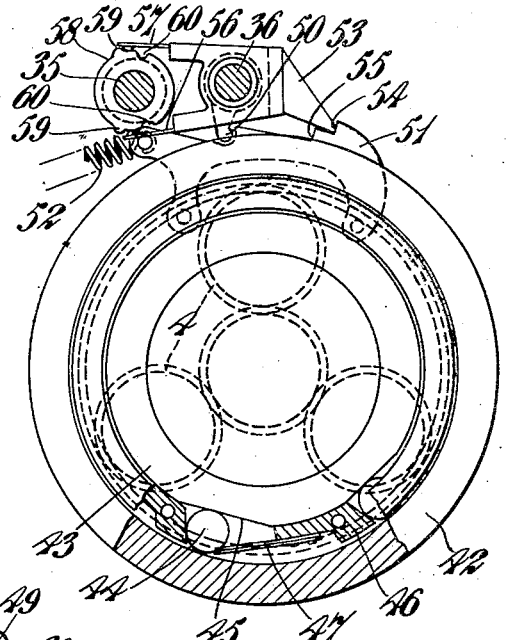
Fig. 3.
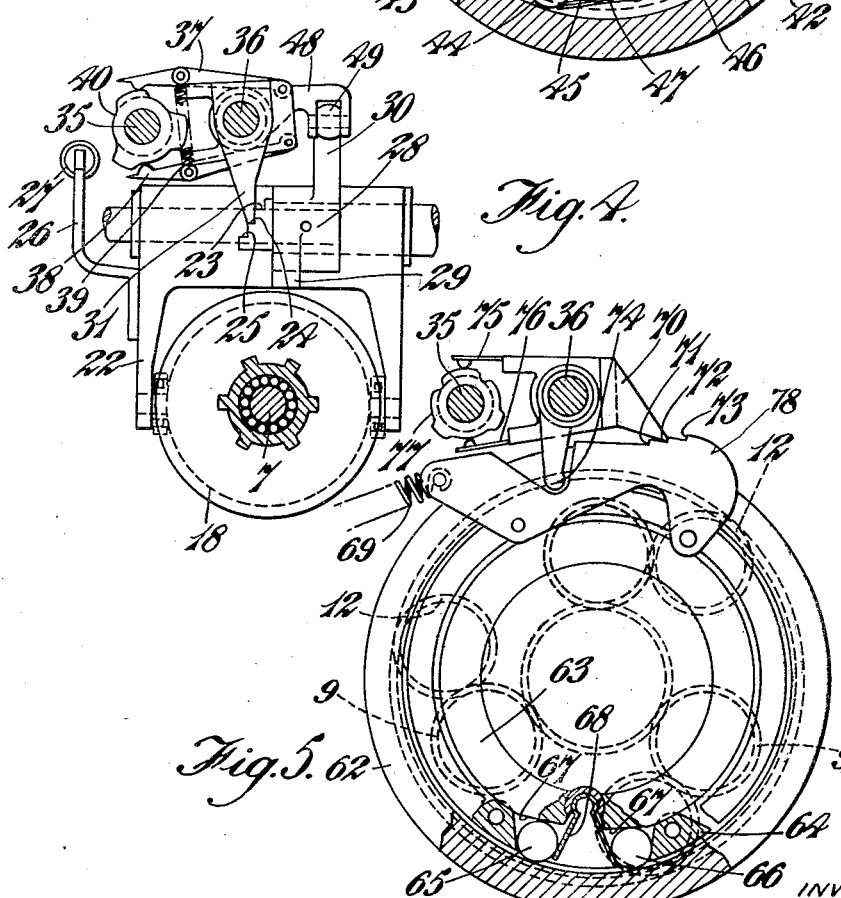
Fig. 4.
Fig. 5.
INVENTOR
Alec C. Clayton July 30, 1935.  A. C. CLAYTON  2,009,477
CHANGE SPEED GEAR
Filed Jan. 23, 1935   5 Sheets-Sheet 4
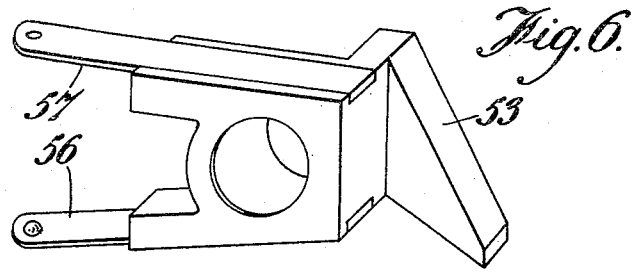
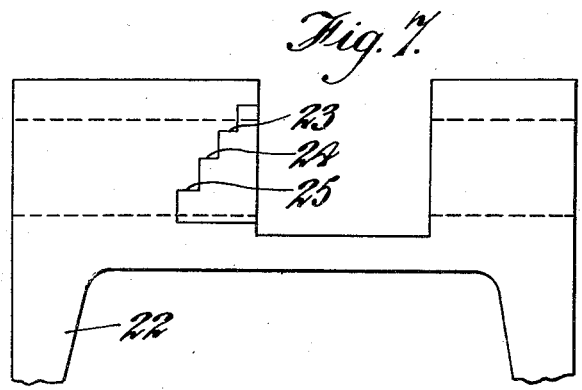
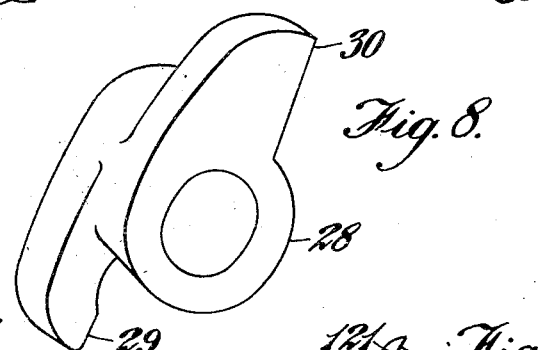
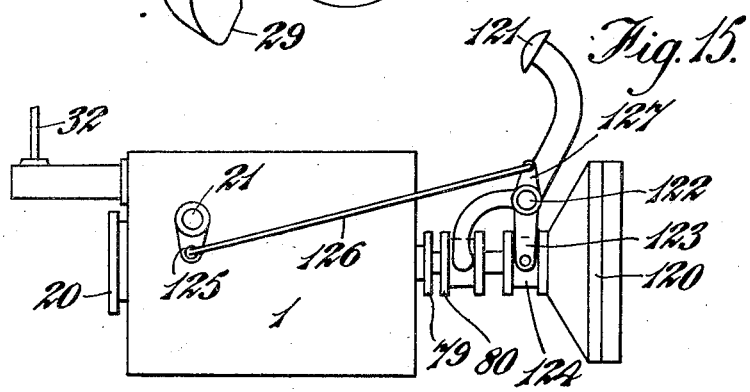
INVENTOR
Alec C. Clayton
by
atty.

July 30, 1935.  A. C. CLAYTON  2,009,477
CHANGE SPEED GEAR
Filed Jan. 23, 1935  5 Sheets-Sheet 5
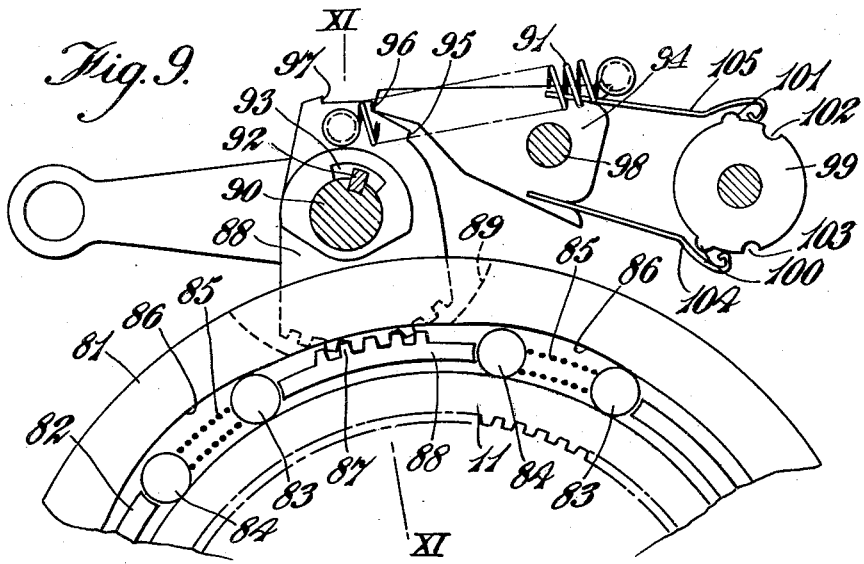
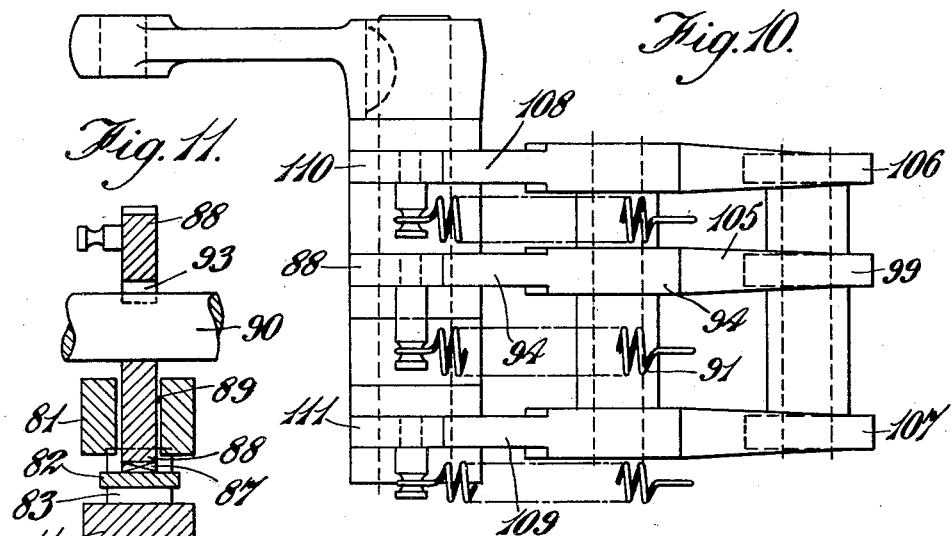
 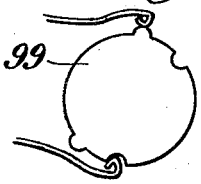
INVENTOR
Alec C. Clayton Patented July 30, 1935

2,009,477

UNITED STATES PATENT OFFICE 2,009,477

CHANGE SPEED GEAR

Alec Charles Clayton, London, England

Application January 23, 1935, Serial No. 3,134
In Great Britain December 6, 1933

6 Claims. (Cl. 74—262)

This invention relates to epicyclic change speed gears for motor driven vehicles and other purposes and particularly to those which include annular reaction wheels or other rotary reaction members, for instance, a rotary layshaft carrier, which have to be arrested and freed to effect gear changes.

In a gear according to the invention, the annular reaction wheels and rotary layshaft carrier, when employed, are adapted to be arrested and freed to effect gear changes by means of ball or roller clutches which comprise stationary ramp members and cages for the rollers which are adapted to be oscillated to move the balls or rollers into and out of operative positions.

The roller cages are preferably partially rotated against the action of springs by mechanism which is connected to the engine clutch or other main driving clutch operating gear, so that when the clutch is disengaged, the roller cages are set in an extreme position with the springs tensioned ready for selective return under the action of their springs, as determined by selecting mechanism, when the driving clutch is re-engaged, the connection of the cages to the clutch operating gear being such as to permit of the cages being controlled by the selecting mechanism during the re-engagement of the clutch.

The selecting mechanism is preferably of such a nature as hereinafter described as to permit of pre-selection. For example, it may include stepped ratchets and pawls, the ratchets moving with the cages so that their return from the set position is controlled or determined by the pawls which are set in the required positions by the selecting mechanism, the pawls having resilient members engaging with setting or selecting cams so that the cams may be pre-set.

The accompanying drawings illustrate forms of epicyclic gear constructed and adapted to operate according to the invention.

Figures 3, 4 and 5 are end elevations of the two annular wheels with their roller clutches, and a sliding clutch collar and fork, respectively.

Figures 6, 7 and 8 are views of separate details of the mechanism.

Figure 9 is an end elevation of part of an annular wheel showing a modified mechanism for moving the roller clutches to operative or inoperative positions.

Figure 10 is a plan view of three of such mechanisms with the associated reaction members omitted.

Figure 11 is a sectional elevation on the line XI—XI of Figure 9.

Figures 12 to 14 are views showing the relative positions of parts of the mechanism of Figure 10.

Figure 15 is a diagrammatic view showing the connections between a main driving clutch and the gear box.

Figure 1:
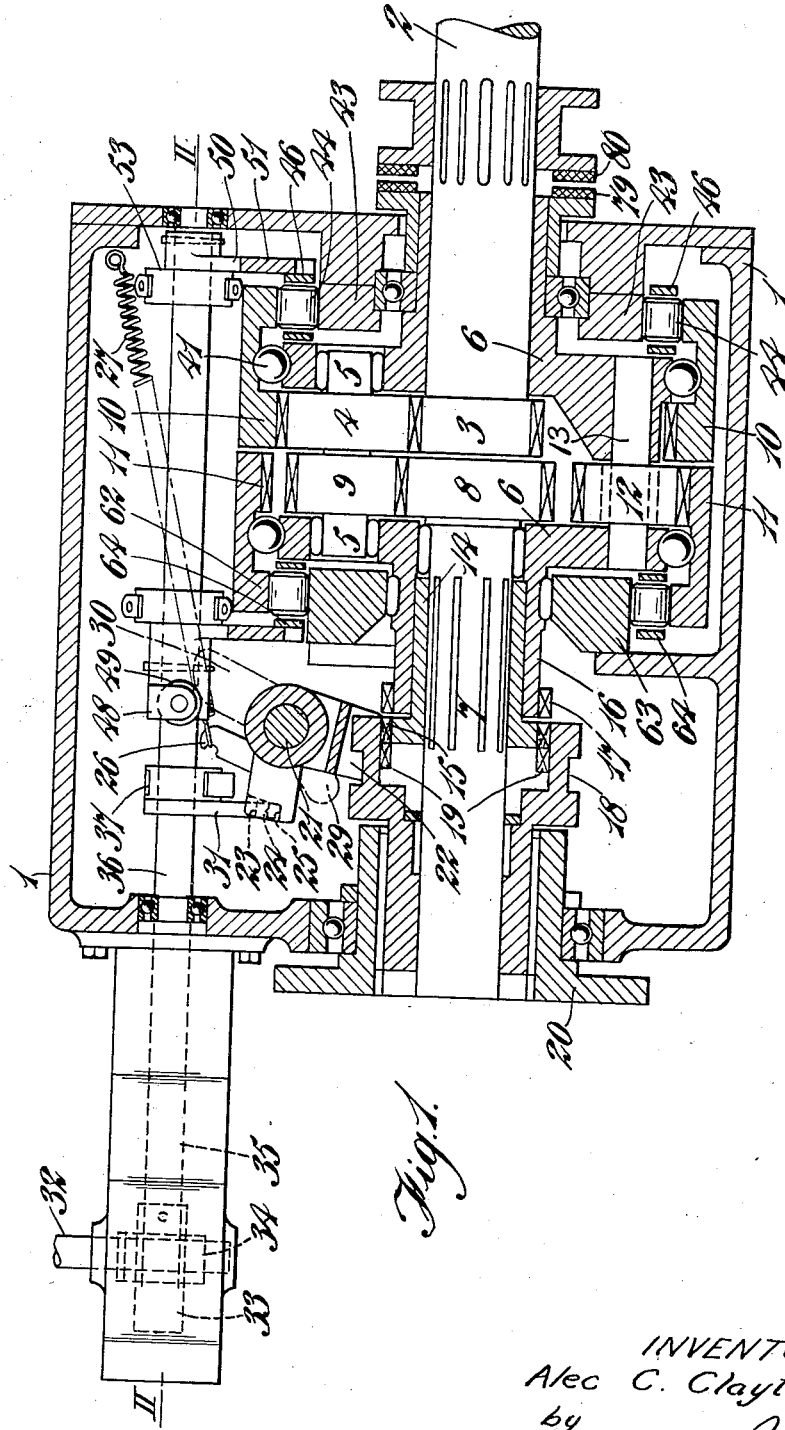
Figure 1 is a front sectional elevation of a gear box according to the invention, the section being taken on the line I—I of Figure 2, which is a sectional plan on the line II—II of Figure 1.
Figure 2:
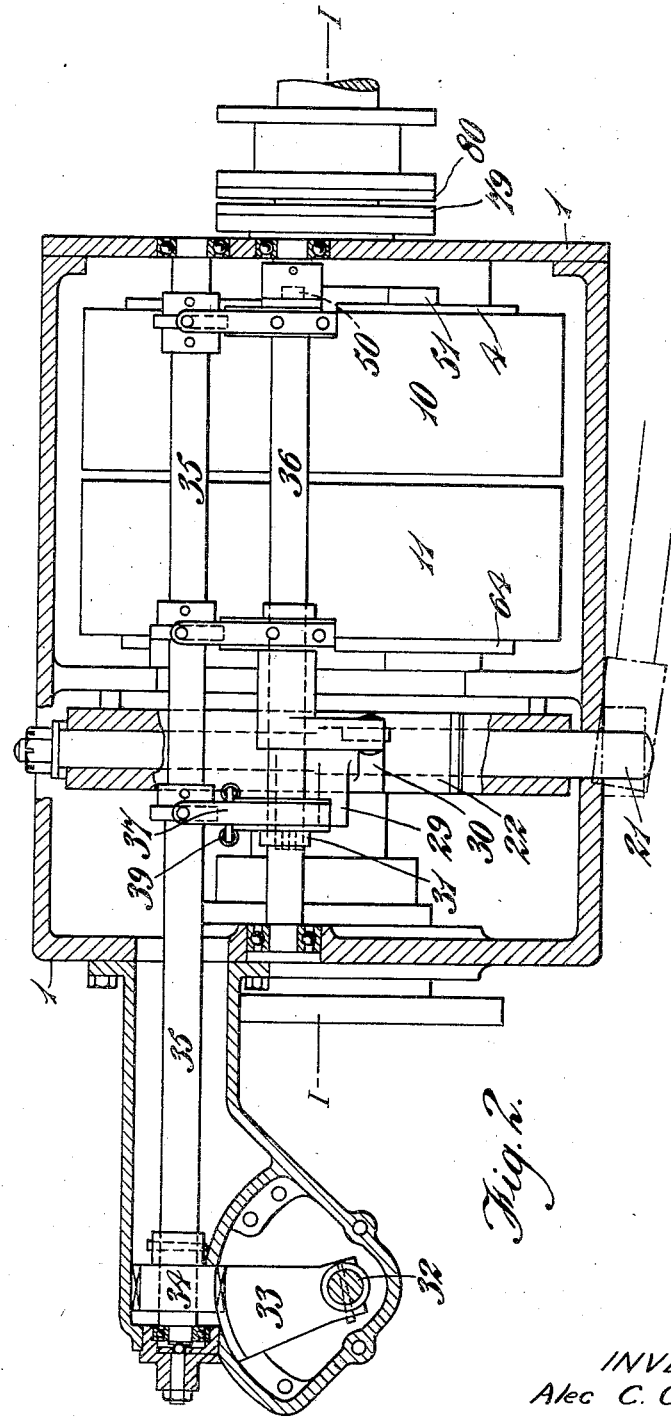

The gear box illustrated in Figures 1 to 8 is designed to give four forward speeds (including a direct drive) and one speed in reverse.

The actual box or housing is designated by the reference numeral 1.

As described in the before-mentioned patent specification, an input shaft 2 is provided with an input sunwheel 3, which is in mesh with three planet pinions 4, each of which is mounted or formed integrally with a layshaft 5 journalled in a rotary carrier 6. An output shaft 7 is provided with an output sunwheel 8 in mesh with three other pinions 9, each of which is carried by a layshaft 5. The planet pinions 4 mesh directly with one annular reaction wheel 10, while those 9 are in geared connection with a second annular reaction wheel 11 through intermediate pinions 12, each of which is freely mounted on a pin 13 in the carrier 6.

A sleeve 14 is keyed to the output shaft 7 and is provided with clutch teeth 15, and the carrier 6 has an extension sleeve 16 provided with similar clutch teeth 17. A sliding clutch member or collar 18 having a set of long internal clutch teeth 19 is splined to an output member 20, which is connected to the propeller shaft of a motor propelled vehicle.

To effect changes of speed, the clutch teeth 19 are moved into engagement with teeth 15 or with teeth 17 singly or with both sets of teeth 15 and 17 simultaneously, the gear illustrated being capable of giving four forward speeds (including a direct drive) and one reverse speed.

By clutching together the teeth 15 and 19, the second and third speeds are obtained by arresting the annular wheels 11 and 10, respectively, the drive being transmitted through the output sunwheel 8.

By clutching together the teeth 16 and 19, the first forward speed and the reverse drive are obtained by arresting the annular wheels 10 and 11, respectively. In this condition, the carrier 6 rotates bodily and transmits the drive.

By clutching together the teeth 15, 17 and 19, the output sunwheel 8 and the layshaft carrier 6 are locked together and the whole gear rotates en bloc to give a direct drive. It will be understood that during direct driving, both reaction wheels are free to rotate idly.

The movement of the collar 18 to any desired position is effected by the driver operating the main driving clutch, e. g., an engine clutch 129, after the position has been pre-selected.

The operating mechanism of the usual engine clutch is connected to a shaft 21 in the gear box, so that the shaft is rocked upon operation of the clutch. The engine clutch 120, which is of any conventional type (Figure 15), is released by depression of a pedal 121 mounted on a shaft 122 and having a fork 123 engaging with a collar 124 on the movable part of the clutch.

The shaft 21 has a lever 125 secured to it, which is connected by a link 126 to a lever 127 movable with the clutch fork 123. Depression of the pedal to disengage the engine clutch causes the shaft 21 to rock in an anticlockwise direction.

A fork 22 (Figure 4) which embraces the collar 18 is loosely mounted on the shaft 21 and has a lug with three teeth 23, 24 and 25. The fork also has an extension 26 to which a spring 27 is connected to urge the fork to move in a clockwise direction (Figure 1). A boss 28 secured to the shaft has a dog 29 and a cam 30.

The driver can ease or slightly release the engine clutch without moving the fork 22, but the continued clutch release movement rocks the shaft 21 sufficiently for the dog 29 to engage with the fork and thereby to move the collar to its extreme right hand position (Figure 1), in which the teeth 19 engage only with those 17.

Upon re-engagement of the engine clutch, the shaft 21 and dog 29 are rocked back again to free the fork which is urged back by its spring 27. The return of the fork, however, is controlled by a spring intercepting pawl 31 which has been set to engage with either of the teeth 23, 24 or 25 on the fork according to whether the clutch teeth 19 on the collar 18 are to engage with the teeth 17 alone, the teeth 15 and 17 together, or the teeth 15 alone.

The position of the spring pawl 31 to engage with either of the teeth 23, 24 or 25 of the fork is determined by the pre-selecting operation.

Pre-selection is effected by the driver in any usual manner, for example, by moving a short lever over a dial or scale graduated to indicate speed changes. Such devices are well known and so have not been illustrated. The movement of the pre-selecting lever causes the partial rotation of a shaft 32 (Figure 2), to which is secured a spiral gear segment 33 which meshes with a spiral pinion 34 secured to a selecting shaft 35.

The spring pawl 31 (Figure 4) is freely mounted on a rock shaft 36, and has two arms 37, 38 pivoted to it. The tongues are drawn towards one another by springs 39 and embrace a cam 40 secured to the selecting shaft 35.

Movement of the pre-selecting handle rotates the cam 40, so that one or other of the arms 37, 38 is raised by a rise on the cam to tension the springs 39 and so energize the pawl. For example, if the spring arm 37 is raised, the pawl will be urged to move clockwise, while if the other arm 38 is raised, the tension of the springs 39 will urge the pawl in the opposite direction.

When the fork 22 is moved as hereinbefore described, the spring pawl is free to move, in accordance with the pre-setting of the cam 40, into the path of one or other of the teeth 23, 24, 25 on the fork, in order to engage with that tooth during the return of the fork and so correctly position the clutch teeth 19 of the collar 18.

Referring to Figures 1 and 3, the annular reaction wheel 10 is partially supported on ball bearings 41 on the carrier 6 and has its rim widened to form a flange 42, which overhangs a ramp member in the form of a ring 43 rigidly secured to the box 1. The inner face of the flange and the periphery of the ramp ring constitute races between which clutching or arresting elements in the form of rollers 44 are situated.

As is seen more clearly in Figure 3, the periphery of the ramp ring is provided with ramps in the form of flats or cam surfaces 45, one for each roller 44.

Each roller is situated in a slot in an annular cage 46 and is urged into contact with one end wall of its slot and with its co-operating cam-surface by means of a pair of blade springs 47.

Partial rotation of the cage in an anti-clockwise direction (Figure 3) will cause each roller 44 to bind between its co-operating cam surface 45 and the flange 42. This arrangement constitutes a one way clutch or brake by which the annular wheel 10 may be arrested against rotation in an anti-clockwise direction (Figure 3), and any tendency of the wheel to turn in this direction has the effect of increasing the binding pressure on the rollers 44. It will be understood that the normal position of the cage is such that the rollers are in the neutral position as shown in Figure 3, in which they are out of binding contact with the flange 42.

The rock shaft 36 hereinbefore mentioned has a lever 48 secured to it, which lever carries a roller 49 at its end. Upon disengagement of the engine clutch and the consequential rocking of the shaft 21, the cam 30 engages with the roller 49 and thereby rocks the shaft 36.

A finger 50 is secured to one end of the shaft 36 and meshes with a recess in a ratchet 51 secured to the side of the cage 46. Upon rocking of the shaft 36, by the disengagement of the engine clutch, the finger 50 engages with the ratchet and partially rotates the cage, to an extreme position, in a clockwise direction, as viewed in Figure 3, against the action of a return spring 52, one end of which is attached to the cage and the other end of which is anchored to the box.

Upon re-engagement of the engine clutch, the cage is free to return under the action of its spring 52, but the distance through which it can move is determined by a spring pawl 53 which is freely mounted on the shaft 36 and which can engage with either of two stepped teeth 54, 55 on the ratchet 51.

The pre-selecting operation determines with which of the teeth 54 or 55 the pawl shall engage and so determines the position of the rollers 44 on their cam surfaces 45, that is, it determines whether the annular wheel 10 shall be freed or arrested. The position of the pawl 53 is controlled in a manner similar to that of the pawl 31 already described.

The pawl 53 has two spring arms in the form of blade springs 56 and 57 secured to it, which embrace and bear on a cam 58 secured to the selecting shaft 35. The cam has two rises 59, 59 and two depressions 60, 60. When the cam is turned so that the ends of both blade springs bear on the plain periphery of the cam, the pawl 53 will move into position to engage with the tooth 54 to hold the cage with the rollers 44 in a neutral or non-clutching position upon operation of the rock shaft 36.

However, if the cam is rotated so that the blade spring 56 is flexed by either rise 59 during the pre-selecting operation, the movement of the cage, upon movement of the rock shaft 36, will permit the energized pawl 53 to rock into the path of the tooth 55 on the cage, so that the cage, when its spring 52 attempts to move it, will be arrested. In this position of the cage, the rollers 44 are at the opposite end of their respective cam surfaces 45 and are in position to bind between the ring 43 and flange 42 to arrest the annular wheel 10 against rotation. The rises 59, 59 on the cam 58 are operative when the first and third speeds are to be pre-selected.

If either the first forward speed or reverse drive is required, the annular reaction wheel 11 is arrested. The arresting mechanism for this wheel is similar to that used for the wheel 10, except that, as the annular wheel 11 is used for reverse driving, it must be capable of being arrested against rotation in either direction. The wheel 10 is provided with uni-directional clutching or arresting elements, while the wheel 11 is provided with bi-directional elements.

The annular reaction wheel 11 has its rim extended to form a flange 62 which overhangs a ramp member or ring 63 secured rigidly to the box 1.

A roller cage 64 is provided and, as is shown more clearly in Figure 5, each slot in the cage contains two rollers 65 and 66 which are kept up to their respective ends of the slots, and against ramps in the form of flats or cam surfaces 67 on the ring 63, by means of V springs 68 mounted in the ring.

When the cage is in the position shown in Figure 5, both sets of rollers 65 and 66 are in a neutral position, i. e., they are out of binding contact with the flange 62, so that annular wheel 11 may rotate idly in either direction. If the cage 64 is moved slightly in an anti-clockwise direction, and held in this position, the springs 68 force the rollers 65 towards the ends of the cam surfaces 67, so that attempted rotation of the annular wheel 11 in an anti-clockwise direction causes the rollers 65 to bind between the surfaces 67 and flange 62. This causes the arrest of the annular wheel against anti-clockwise rotation.

In a similar manner, by turning the cage slightly in a clockwise direction and holding it against rotation, the rollers 66 are caused to arrest the annular wheel 11 against clockwise rotation.

The cage 64 is urged in an anti-clockwise direction by a spring 69, and is held in any desired position by means of a spring pawl 70 which is freely mounted on the rock shaft 36 and which can engage with either of three teeth 71, 72 or 73 on a ratchet 78 secured to the side of the cage.

A finger 74, secured to the shaft 36, meshes with a recess in the ratchet 78 so that when the engine clutch is released and the shaft 36 is rocked as hereinbefore described, the finger engages with the lug to rotate partially the cage in a clockwise direction to an extreme position. Upon the re-engagement of the engine clutch and the consequential rocking back of the shaft 36, the cage is also urged, by its spring 69, to return, the distance of return being determined by the pawl 70 engaging with one of the teeth 71, 72 or 73.

The pre-selecting operation determines the position of the pawl 70.

The pawl 70 has two spring arms in the form of blade springs 75 and 76, which embrace and bear against a cam 77 secured to the selecting shaft 35.

Assuming that the second speed is pre-selected, the cam 77 is moved so that the blade spring 75 is flexed, and the pawl 70 thereby energized, so that the pawl rocks into the path of the tooth 71 upon the rotation of the cage by the finger 74. Upon the attempted return of the cage, under the action of the spring 69, the tooth 71 engages with the pawl 70 and arrests the cage with the rollers 65 in clutching position to arrest the annular wheel 11 against clockwise rotation.

If the pre-selecting operation sets the cam 77 so that neither spring 75 nor 76 is flexed, the position of the pawl 70, upon the operation of the engine clutch, is such that the pawl 70 engages with the tooth 72 to arrest the cage with all the rollers 65 and 66 in neutral positions to permit of the idle rotation of the annular wheel 11.

Assuming that reverse driving is desired, then the pre-selecting operation adjusts the cam 77 to flex the blade spring 76 of the pawl 70, so that upon operation of the engine clutch, the pawl is caused to engage with the tooth 73 and thereby hold the cage with the rollers 66 in clutching position. The annular reaction wheel 11 is thus held against anti-clockwise rotation. Under these conditions, the planet pinions 9 and intermediate pinons 12 travel round the stationary annular reaction wheel 11, causing the carrier 6 to revolve in a direction opposite to that of the input shaft 2.

It will be understood that the cams 58 and 77 are so angularly disposed on their shaft 35, that only one annular wheel 10 or 11 can be arrested for any forward speed or for the reverse speed setting of the driver's pre-selecting handle, while if the handle is set for direct drive, neither wheel is arrested. The cam 40 is so set in angular relation to the cams 58 and 77 that the collar 18 is correctly positioned to give the desired speed.

A friction clutch 79, 80 is arranged between the carrier 6 and the input shaft 1 in a manner similar to that described in the before-mentioned specification. Upon release of the engine clutch, the clutch 79, 80 is automatically engaged, by means of a fork 127 connected to the main clutch fork 123 (Figure 15). While a gear change is being effected, there is no torque transmitted from the engine and the friction clutch 79, 80 causes the whole of the gear to rotate en bloc. The clutch 79, 80 is disengaged upon re-engagement of the engine clutch.

In Figures 9 to 14, a modified form of arresting mechanism according to the invention is illustrated.

In this form, the layshaft carrier 6 as well as each annular reaction wheel is adapted to be arrested in order that a wide range of forward and reverse speeds may be obtained, as is explained in the before-mentioned specification.

The method of arresting each reaction member, whether an annular wheel or the carrier, is similar and so it will be described in detail with reference to the annular wheel 11.

The rim of the wheel 11 is surrounded by a ramp member or ring 81 which is rigidly secured to the actual gear box or housing. A cage 82 is situated between the ring and the wheel and has a number of slots, each of which contains two rollers 83 and 84, the rollers being kept apart and up to the ends of their slots by springs 85.

The inner surface of the ring and the periphery of the annular wheel form races for the rollers 83 and 84 which constitute clutching or arresting elements by means of which the annular wheel may be arrested against rotation. The ring is provided with a ramp or cam surface 86 for each pair of rollers, and so long as the cage 82 is maintained in the central position which it occupies in Figure 9 the rollers are out of clutching engagement with the ring.

The cage 82 is provided with a number of gear teeth 87 for engagement with a toothed sector 88, which extends through a slot 89 in the ring 81 and is mounted on a rock shaft 90. The shaft 90 is connected to the engine clutch operating mechanism and is rocked at each operation of the engine clutch. A spring 91 secured to the sector 88 and anchored to the gear box urges the cage in an anti-clockwise direction.

When the engine clutch is disengaged, the shaft 90 is partially rotated and a key 92 on the shaft, working in a wide keyway 93 in the sector, turns the sector to move the cage 82 clockwise to its fullest extent.

Upon the re-engagement of the engine clutch, the cage is returned under the action of the spring 91 until arrested by a spring pawl 94 engaging with one or other of three teeth 95, 96 or 97 on the sector.

The pawl 94 is freely mounted on an axle 98 and its angular position to engage with one or other of the teeth is determined by a pre-selection operation in a manner similar to that described for setting the pawls in the previously described embodiment of the invention. Operation of the driver's pre-selecting handle rotates a selecting shaft on which a cam 99 is secured. The cam has two rises 100, 101 and two depressions 102, 103, and is embraced by two resilient arms such as blade springs 104, 105 fixed to the pawl.

If it is desired to change into the forward speed which is obtainable by arresting the annular reaction wheel 11, that speed is pre-selected by turning the cam 99, so that its rise 101 engages with and flexes the blade spring 105. Upon partial rotation of the sector, the energized pawl is free to rock in a clockwise direction and the end of the blade spring 104 enters the recess 103 in the cam. The pawl is thus moved into the path of the tooth 95, and when the engine clutch is re-engaged, the return of the cage is limited by the engagement of the tooth 95 with the pawl 94. The rollers 83 are thus maintained in a position to bind between the cam surfaces 86 and the periphery of the annular wheel and so arrest the annular wheel against clockwise rotation.

Had a reverse speed been desired, the cam 99 would have been turned to cause its rise 100 to flex the blade spring 104, so that the pawl would eventually rock into the path of the tooth 97, the end of the spring 105 entering the depression 102. In this position of the pawl, the cage would move to its fullest extent and cause the rollers 84 to arrest the annular wheel against anti-clockwise rotation.

If a speed is pre-selected in which the reaction wheel 11 is to rotate idly, both blade springs 104 and 105 bear on the plain periphery of the cam 99 to cause the pawl 94 to engage with the tooth 96, as is shown.

Figures 12 to 14 show the relative angular relation of three cams 99, 106 and 107 associated with similar pawls 94, 108 and 109 for co-operating with toothed sectors 88, 110 and 111, respectively (Figure 10). The sectors are in mesh with teeth on roller cages containing arresting elements for the two annular wheels 11 and 10, and the layshaft carrier 6.

The key and slot driving connection 92, 93 is provided for each sector 88, 110 and 111 and permits a certain degree of lost motion between the shaft and the sectors, so that the shaft is free to return with the re-engagement of the engine clutch, irrespective of whether one of the sectors has been arrested by its pawl.

It will be appreciated that the clutching or arresting elements may be in the form of balls instead of rollers.

I claim:

1. In an epicyclic change speed gear of the type having rotary reaction members adapted to be arrested and freed to effect speed changes, means for arresting and freeing said reaction members including stationary ramp members, rollers for co-operating with said ramp members and said reaction members, cages for said rollers, means operable by the driver for partially rotating said cages in one direction, springs for rotating said cages in the opposite direction when released by driver operated means, and means for selectively intercepting said cages when so released.

2. In combination an epicyclic change speed gear having rotary reaction members adapted to be arrested and freed to effect speed changes, a main driving clutch, means operable by the driver for operating said clutch, means for arresting and freeing said rotary reaction members comprising stationary ramp members, rollers for co-operation with said ramp members and said rotary reaction members, cages for said rollers, springs for partially rotating said carriers in one direction, means connected to said main clutch operating means for partially rotating said cages in the opposite direction against the action of said springs when the main clutch is disengaged, and means for selectively intercepting said cages when the main clutch is re-engaged, substantially as and for the purposes hereinbefore set forth.

3. In combination an epicyclic change speed gear having rotary reaction members adapted to be arrested and freed to effect speed changes, a main driving clutch, means operable by the driver for operating said clutch, means for arresting and freeing said rotary reaction members comprising stationary ramp members, rollers for co-operation with said ramp members and said rotary reaction members, cages for said rollers, springs for partially rotating said carriers in one direction, means connected to said main clutch operating means for partially rotating said cages in the opposite direction against the action of said springs when the main clutch is disengaged, and means for selectively intercepting said cages when the main clutch is re-engaged, comprising stepped ratchets movable with said roller cages, pawls for engaging with said ratchets, and means operable by the driver for selectively setting said pawls relatively to said ratchets, substantially as and for the purposes hereinbefore set forth.

4. In combination an epicyclic change speed gear having rotary reaction members adapted to be arrested and freed to effect speed changes, a main driving clutch, means operable by the driver for operating said clutch, means for arresting and freeing said rotary reaction members comprising stationary ramp members, rollers for co-operation with said ramp members and said rotary reaction members, cages for said rollers, springs for partially rotating said carriers in one direction, means connected to said main clutch operating means for partially rotating said cages in the opposite direction against the action of said springs when the main clutch is disengaged, and means for selectively intercepting said cages when the main clutch is re-engaged, comprising stepped ratchets movable with said roller cages, pawls for engaging with said ratchets, said pawls having resilient arms, selecting cams embraced by said arms, and a selecting shaft operable by the driver for rotating said cams into selected positions to tension said resilient arms preparatory to the movement of the roller cages and their ratchets during the disengagement of the driving clutch and ready for selective engagement with their respective ratchets when said clutch is re-engaged.

5. An epicyclic change speed mechanism as specified in claim 4, having the stepped ratchets directly connected to the roller cages, fingers for engaging with said ratchets, and means operatively connected to the driving clutch operating mechanism for oscillating said fingers, substantially as and for the purposes hereinbefore set forth.

6. An epicyclic change speed gear comprising an input sunwheel operatively connected to a main driving clutch, an output sunwheel, layshaft pinions in mesh with said input and output sunwheels, annular reaction wheels in geared connection with said layshaft pinions, a rotary carrier for said layshaft, an output member and a dog-clutch member for selectively connecting the output member to the output sunwheel and to the layshaft carrier individually or to both simultaneously, means for arresting said annular reaction wheels including stationary ramp members, rollers for co-operating with said ramp members and said reaction wheels, cages for said rollers, means operatively connected to the operating mechanism of the main driving clutch for moving said roller cages and said dog clutch member in one direction to an extreme position, when said main driving clutch is disengaged, return springs for said roller cages and said dog clutch member, and means for selectively intercepting said roller cages and said dog clutch member when released on the re-engagement of said main driving clutch, comprising stepped ratchets movable by said roller cages and said dog clutch member, intercepting pawls for engagement with said ratchets, a selecting shaft, cams on said shaft adapted to be moved into selected positions to selectively set said pawls relatively to their respective ratchets.

ALEC CHARLES CLAYTON.